(12) United States Patent
Shudo (10) Patent No.: US 6,295,178 B1
(45) Date of Patent: Sep. 25, 2001

(54) CASSETTE AND RECORDING/ REPRODUCING APPARATUS AND METHOD USING THE SAME

(75) Inventor: Katsuyuki Shudo, Yokosuka (JP)

(73) Assignee: Victor Company of Japan, Ltd., Yokohama (JP)

(*) Notice: Subject to any disclaimer, the term of this patent is extended or adjusted under 35 U.S.C. 154(b) by 0 days.

(21) Appl. No.: 09/057,693

(22) Filed: Apr. 9, 1998

(30) Foreign Application Priority Data

Apr. 9, 1997 (JP) .................................... 9-105420

(51) Int. Cl.[7] ...................................... G11B 5/02
(52) U.S. Cl. .................. 360/55; 360/72.1; 360/72.2; 360/132; 360/27; 242/345; 352/123; 352/129
(58) Field of Search .................... 360/72.1, 182, 360/61, 72.2, 55, 27, 64, 15, 132; 242/337, 337.1, 345, 341, 345.1, 347.1; 352/31, 123, 129

(56) References Cited

U.S. PATENT DOCUMENTS

| | | | |
|---|---|---|---|
| 3,640,479 | * | 2/1972 | Hata ................................... 242/326.3 |
| 3,727,198 | * | 4/1973 | Lowenson ............................. 360/15 |
| 4,012,771 | * | 3/1977 | Ishigaki et al. ....................... 386/24 |
| 4,206,487 | * | 6/1980 | Sato ..................................... 360/94 |
| 4,974,100 | * | 11/1990 | Odaka et al. .......................... 360/90 |
| 5,245,485 | * | 9/1993 | Dunn et al. ............................ 360/69 |
| 5,911,379 | * | 6/1999 | Adams ................................. 242/346 |
| 5,963,395 | * | 10/1999 | Rudi .................................... 360/96.1 |
| 5,979,814 | * | 11/1999 | Childers ............................. 242/347.1 |
| 6,078,481 | * | 6/2000 | Vanderheyden et al. ............. 360/132 |

FOREIGN PATENT DOCUMENTS

| | | | |
|---|---|---|---|
| 58-185073A | * | 10/1983 | (JP) ........................................... 23/8 |
| 4-016079 | | 1/1992 | (JP) . |
| 7-123346 | | 5/1995 | (JP) . |
| 10-340560A | * | 12/1998 | (JP) ........................................... 23/8 |

* cited by examiner

*Primary Examiner*—David Hudspeth
*Assistant Examiner*—Dan I. Davidson
(74) *Attorney, Agent, or Firm*—Anderson, Kill & Olick, P.C.

(57) ABSTRACT

A cassette houses a first and a second tape-like recording medium. The cassette is provided with a first and a second reel, at least a first tape guide provided between the first and second reels, a third and a fourth reel and at least a second tape guide provided between the third and fourth reels. The first tape-like recording medium is wound around the first and second reels via the first tape guide. The second tape-like recording medium is wound around the third and fourth reels via the second tape guide. The first and second reels may be arranged in a first direction in the cassette. And the third and fourth reels may be arranged in a second direction orthogonal to the first direction in the cassette. The cassette may have a first side face formed in the first direction and a second side face formed in the second direction, each side face having an opening through which data is recorded on or reproduced from the first or the second tape-like recording medium by a recording and reproducing apparatus.

15 Claims, 6 Drawing Sheets

CASSETTE AND RECORDING/ REPRODUCING APPARATUS AND METHOD USING THE SAME

BACKGROUND OF THE INVENTION

The present invention relates to a cassette housing a tape-like recording medium and being attached, in use, to a recording and reproducing apparatus such as video cassette recording (VCR) and a streamer, and an apparatus and a method of recording and reproducing data to and from a tape-like recording medium housed in a cassette.

A well known format of data recorded on a tape-like recording medium, for example, a magnetic tape is such that a plurality of programs such as movies are arranged in series on the tape-like recording medium in its longitudinal direction when the programs are recorded in series on a time axis.

This data format requires forward/backward winding to find a head portion of any program with a result that a quick access to any program is impossible.

SUMMARY OF THE INVENTION

A purpose of the present invention is to provide a compact cassette that houses tape-like recording media for quick access.

Another purpose of the present invention is to provide a recording and reproducing apparatus using the cassette.

Still another purpose of the present invention is to provide an apparatus and a method of reproducing, with quick access, data recorded on the tape-like recording media housed in the cassette.

The present invention provides cassette comprising: a first and a second reel; at least a first guide pole (first tape guide) provided between the first and second reels; a first tape-like recording medium wound around the first and second reels via the first guide pole; a third and a fourth reel; at least a second guide pole (second tape guide) provided between the third and fourth reels; and a second tape-like recording medium wound around the third and fourth reels via the second guide pole.

Further, the present invention provides a recording and reproducing apparatus comprising at least one recording and reproducing mechanism used for recording and reproducing data on and from a first and a second tape-like recording medium contained in a cassette having a first and a second reel, at least a first guide pole provided between the first and second reels, a third and a fourth reel and at least a second guide pole provided between the third and fourth reels, the first tape-like recording medium being wound around the first and second reels via the first guide pole, the second tape-like recording medium being wound around the third and fourth reels via the second guide pole.

Further, the present invention provides an apparatus for reproducing data from a first and a second tape-like recording medium, comprising: a reproducer to reproduce one of head fields of a plurality of main data, each head field being recorded after a sub discriminating data on the second tape-like recording medium; and a controller to search one of main discriminating data identical to the sub discriminating data, each main discriminating data being recorded in front of the main data on the first tape-like recording medium, the first and second recording media being contained in a cassette such that the second tape-like recording medium is shorter in length than the first tape-like recording medium, and to switch reproduction of the reproducer from the second tape-like recording medium to the first tape-like recording medium when the reproduction of the head field is complete, thus controlling the reproducer to reproduce main data that follows the searched main discrimination data.

Further, the present invention provides an apparatus for reproducing data from a first and a second tape-like recording medium, comprising: a reproducer to reproduce one of head fields of a plurality of main data, the head fields being recorded on the second tape-like recording medium, the first and second tape-like recording media being contained in a cassette such that the second tape-like recording medium is shorter in length than the first tape-like recording medium; and a controller to search a first end portion identical to a second end portion of the head field which is being reproduced, while the second and portion is being reproduced, the first and portion being recorded at a head of each of the main data recorded on the first tape-like recording medium, and to switch reproduction of the reproducer from the second tape-like recording medium to the first tape-like recording medium when the reproduction of the second end portion is complete, thus controlling the reproducer to reproduce main data that follows the searched first end portion.

Further, the present invention provides a method of reproducing data from a first and a second tape-like recording medium, comprising the steps of: reproducing one of head fields of a plurality of main data, each head field being recorded after a sub discriminating data on the second tape-like recording medium; search one of main discriminating data identical to the sub discriminating data, each main discriminating data being recorded in front of the main data on the first tape-like recording medium the first and second recording media being contained in a cassette such that the second tape-like recording medium is shorter in length than the first tape-like recording medium; switching reproduction from the second tape-like recording medium to the first tape-like recording medium when the reproduction of the head field is complete; and reproducing main data that follows the searched main discrimination data.

Further, the present invention provides a method of reproducing data from a first and a second tape-like recording medium, comprising the steps of: reproducing one of head fields of a plurality of main data, the head fields being recorded on the second tape-like recording medium, the first and second tape-like recording medium, contained in a cassette such that the second tape-like recording medium is shorter in length than the first tape-like recording medium; searching a first end portion identical to a second end portion of the head field which is being reproduced, while the second end portion is being reproduced, the first end portion being recorded at a head of each of the main data recorded on the first tape-like recording medium; switching reproduction from the second tape-like recording medium to the first tape-like recording medium when the reproduction of the second and portion is complete; and reproducing main data that follows the searched first end portion.

DETAILED DESCRIPTION OF PREFERRED EMBODIMENTS

Preferred embodiments according to the present invention will be explained with reference to the attached drawings.

Figure 1:
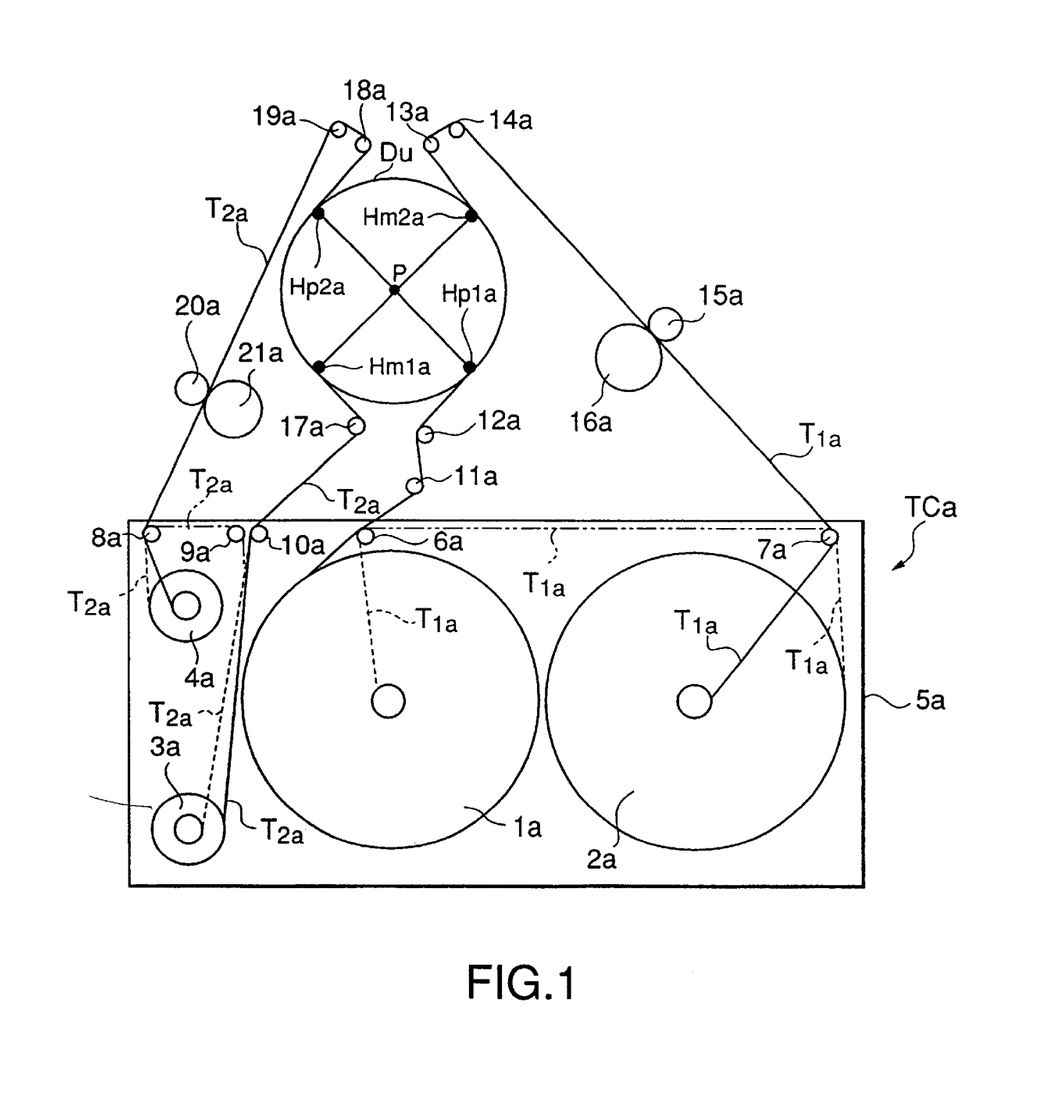
FIG. 1 illustrates a cassette and a recording and reproducing apparatus as the first preferred embodiment according to the present invention.
Figure 4:
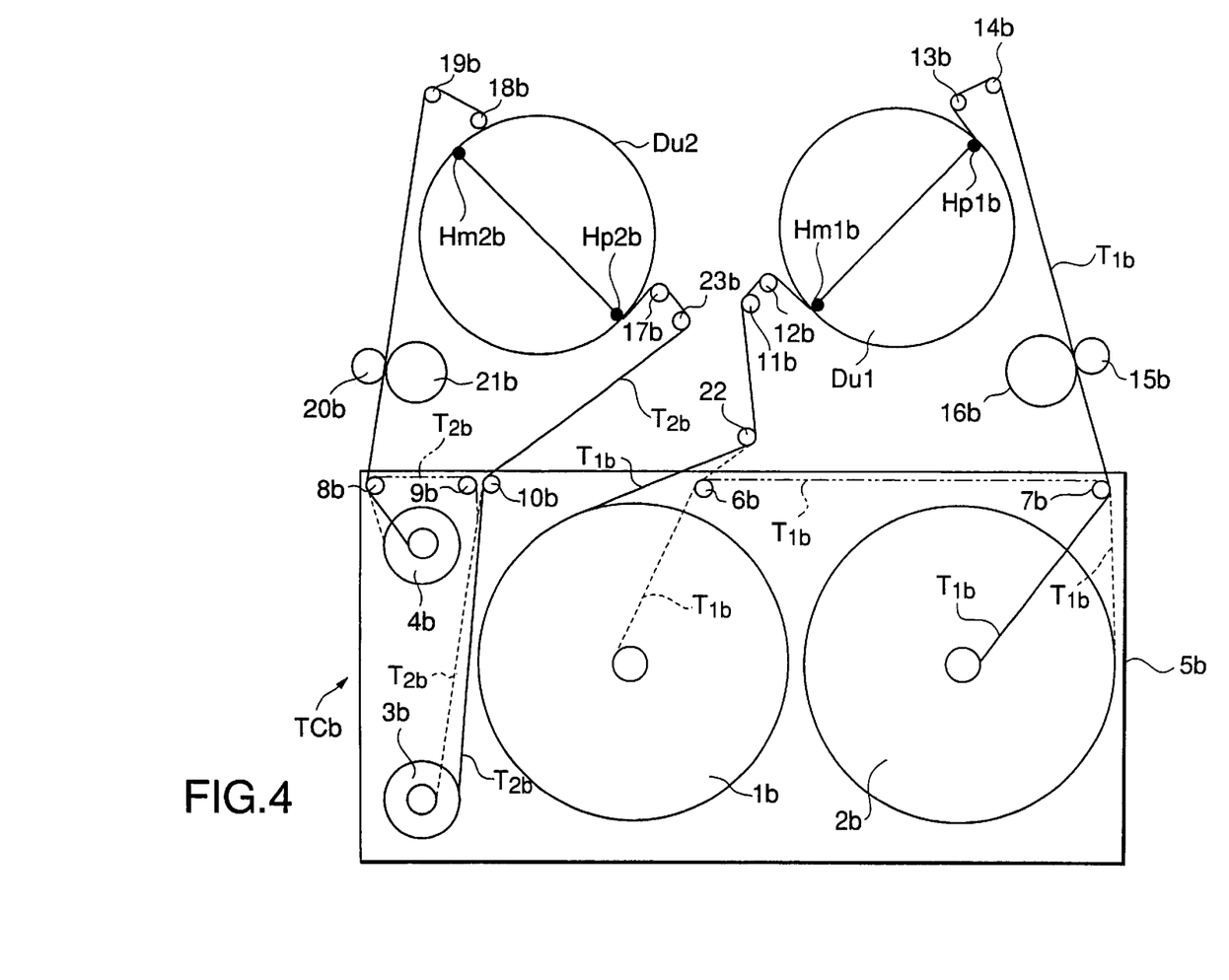
FIG. 4 illustrates a cassette and a recording and reproducing apparatus as the second preferred embodiment according to the present invention.
Figure 6:
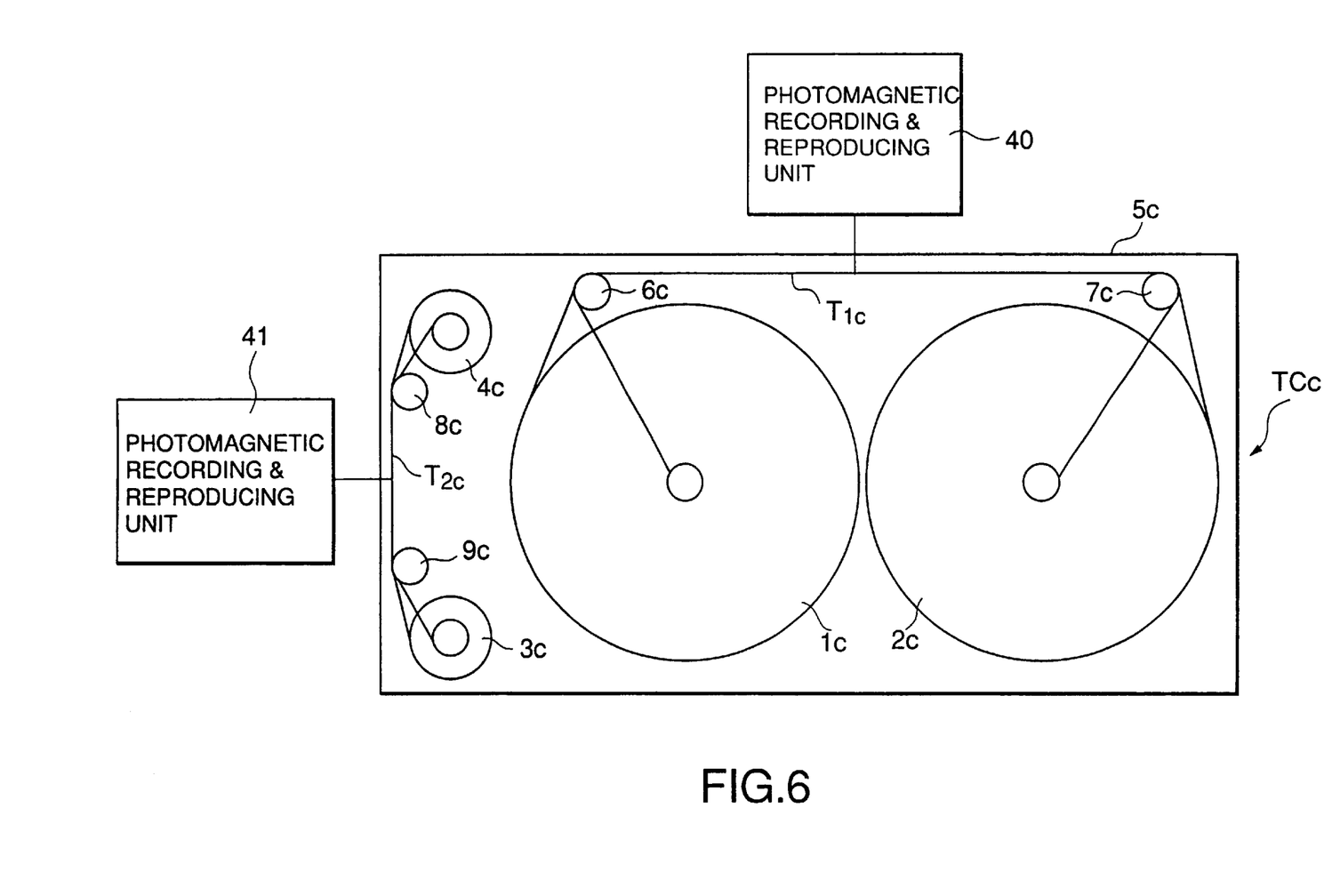
FIG. 6 illustrates a cassette and a recording and reproducing apparatus as the third preferred embodiment according to the present invention.

For brevity, FIGS. 1, 4 and 6 show only tape reels, tape-like recording media, guide poles and a cassette frame of a recording and reproducing apparatus.

However, cassettes TCa, TCb and TCc shown in FIGS. 1, 4 and 6, respectively, according to the present invention, consist of an upper cassette (half) and a lower cassette (half) for housing reels to which tape-like recording media are wound.

Each cassette is further provided with a cover (opening door) to be opened in use, openings to which loading mechanisms are to be inserted in use, a reel looking mechanism for the cassette being out of use and a slot formed at the cassette bottom, to which a reel unlocking member is to be inserted.

Each cassette is further provided with an erroneous insertion protecting groove and an inserting direction-guide groove, etc., both grooves corresponding to an erroneous insertion protecting mechanism provided to a cassette housing of a recording and reproducing apparatus.

Tape-like recording media shown in FIGS. 1 and 4 are magnetic tapes composed of ferromagnetic recording materials.

In FIG. 1, a recording and reproducing mechanism is provided with a rotary drum with two rotary head pairs. On the other hand, in FIG. 4, a recording and reproducing mechanism is provided with two rotary drums, each with a rotary head pair.

Rotary heads of each pair shown in FIG. 4 are arranged to face each other with reverse azimuth angles. In recording or reproduction, the rotary drum is rotated at a predetermined rotation speed for helical scanning, with the rotary head pairs, of a magnetic tape wound around the rotary drum and a fixed drum and travelling therebetween at a predetermined speed.

On the other hand, a tape-like recording medium shown in FIG. 6 is an photomagnetic tape composed of an photomagnetic recording material.

In recording, a laser beam is irradiated onto the photomagnetic tape to cause magnetic change corresponding to data to be recorded in a magnetic layer of the photomagnetic tape. The magnetic change happens when magnetic characteristics of the photomagnetic recording material changes due to head caused by the laser bean.

On the other hand, in reproduction, another laser beam is irradiated onto the photomagnetic tape to read the magnetic change that has happened in the recording. The reproduction is done with an optical effect such as Faraday effect and Kerr effects exhibited by the photomagnetic recording material when the laser beam is irradiated thereon.

A cassette structure common to FIGS. 1, 4 and 6 is as follows:

A first tape-like recording medium T1a, T1b or T1c shown in FIGS. 1, 4 or 6, respectively, is wound around a first supply reel 1a, 1b or 1c and a second take-up reel 2a, 2b or 2c via guide poles 6a, 6b or 6c and 7a, 7b or 7c provided therebetween.

Further, a second tape-like recording medium T2a, T2b or T2c is wound around a third supply reel 3a, 3b or 3c and a fourth take-up reel 4a, 4b or 4c via guide poles 8a, 8b and 8c and 9a, 9b or 9c provided therebetween.

The first tape-like recording medium T1a, T1b or T1c is longer than the second tape-like recording medium T2a, T2b or T2c and hence the first and second reels 1a, 1b or 1c and 2a, 2b or 2c are longer in diameter than the third and fourth reels 3a, 3b or 3c and 4a, 4b or 4c in FIGS. 1, 4 and 6.

In a more preferable embodiment, the second tape-like recording medium T2a, T2b or T2c is shorter in length than the first tape-like recording medium T1a, T1b or T1c. Further, the second tape-like recording medium T2a, T2b or T2c is thicker is tape thickness than the first tape-like recording medium T1a, T1b or T1c. The second tape-like recording medium thus becomes more durable for high speed search.

The first real 1a, 1b or 1c and the second reel 2a, 2b or 2c are arranged in a longitudinal (first) direction of a cassette frame 5a, 5b or 5c. On the other hand, the third reel 3a, 3b or 3c and the fourth reel 4a, 4b or 4c are arranged in a (second) direction orthogonal to the longitudinal direction.

In FIGS. 1 and 4, chain double-dashed lines are drawn between the guide poles 6a and 7a, and 6b and 7b and further between the guide poles 8a and 9a, and 8b and 9b. These lies indicate the tape-like recording media T1a and T2a, and T1b and T2b while the cassettes Tca and TCb are out of use, or each cassette is not loaded into the recording and reproducing apparatus. Nevertheless, FIGS. 1 and 4 show that the cassettes Tca and TCb are in use, or each cassette is loaded into the recording and reproducing apparatus.

Once the cassette TCa or TCb is loaded into the recording and reproducing apparatus, the cover (not shown but described above) provided on a side face of the cassette frame 5a or 5b is opened and then the loading mechanisms (not shown but described above) are inserted into the openings (not shown but described above) formed on the cassette TCa or TCb.

Now, the first preferred embodiment of the cassette and the recording and reproducing apparatus according to the present invention will be described in detail.

In FIG. 1, the first and second tape-like recording media, that is, magnetic tapes T1a and T2a are pulled out by the loading mechanisms and wound around a rotary drum Du but different outer surfaces thereof. The magnetic tapes T1a and T2a are then set along different tape travel passages for recording or reproduction.

In detail, after pulled out from the first reel 1a, the magnetic tape T1a is set along the tape travel passage of the guide poles 6a, a guide pole 11a, an inclined pole 12a, the outer surface of the rotary drum Du and a fixed drum (not shown), an inclined pole 13a, a guide pole 14a, a capstan 15a and a pinch roller 16a, the guide pole 7a and the second reel 2a.

Further, after pulled out from the third reel 3a, the magnetic tape T2a is set along the tape travel passage of a guide pole 10a, an inclined pole 17a, the outer surface of the rotary drum Du and fixed drum (not shown), an inclined pole 18a, a guide pole 19a, a capstan 20a and a pinch roller 21a, the guide pole 8a and the fourth reel 4a.

The magnetic tapes T1a and T2a pulled out by the loading mechanisms are wound around the rotary drum Du and fixed drum (not shown) but different first and second outer surfaces thereof. Each outer surface corresponds to a range covered by a central angle 90 degrees. The first and second outer surfaces are symmetrical with respect to the central axis P of the rotary drum Du.

In FIG. 1, each of first and second rotary heads Hp1a and Hp2a is provided with a magnetic gap having an azimuth angle α of 90 degrees or less in a clockwise direction with respect to a width direction of a locus of data recorded on the magnetic tape T1a or T2a.

On the other hand, in FIG. 1, each of third and fourth rotary heads Hm1a and Hm2a is provided with a magnetic gap having the azimuth angle α of 90 degrees or less in an anticlockwise direction with respect to the width direction of the locus of data recorded on the magnetic tape T1a or T2a.

The first and second rotary heads Hp1a and Hp2a are provided to face each other with respect to the central axis P of the rotary drum Du. The same is true for the third and fourth rotary heads Hm1a and Hm2a. Further, the four rotary heads Hp1a, Hm1a, Hp2 and Hm2a are positioned on the surface of the rotary drum Du so that adjacent two rotary heads such as the rotary heads Hp1a and Hm1a form 90 degrees with respect to the central axis P of the rotary drum Du.

FIG. 1 shows the four rotary heads as arranged as described above, however, N (a natural number of 2 or more) sets of rotary heads each set including the four rotary heads may be installed in the recording reproducing apparatus.

The first preferred embodiment of the recording and reproducing apparatus according to the present invention will be described further with reference to FIG. 2.

Data signals to be recorded are input to the recording and reproducing apparatus via an input terminal 37 and output via an output terminal 38 when reproduced.

Control signals for recording/reproduction control are input to the recording and reproducing apparatus via an input terminal 39.

Controller and signal processor 26 includes a CPU, ROMs and RAMs and is connected to an external buffer memory 27. The controller and signal processor 26 controls the recording and reproducing apparatus in its overall operation and processes the input and output signals.

More in detail, the controller and signal processor 26 converts the data signals to be recorded, in recording, into recording signals suitable for recording operation. The recording signals are supplied to recording and reproducing circuits 28, 29, 30 and 31. In reproduction, the controller and signal processor 26 converts reproduced signals from the magnetic tape T1a or T2a into original data signals.

If the recording and reproducing apparatus is a digital VTR, the controller and signal processor 26 conducts digital signal processing, in input and output signal processing, such as AD conversion, Discrete Cosine Transforms (DCT) block formation, DCT processing, quantization and variable-length coding, error correcting code addition, wave form equalization signal processing, error correction, variable-length decoding and inverse-DCT processing.

The recording and reproducing circuits 28, 29, 30 and 31 supply the recording signals from the controller and signal processor 26 via the rotary heads Hp1a, Hm1a, Hp2a and He2a to the first magnetic tape T1a or the second magnetic T2a for recording.

In reproduction, the recording and reproducing circuits 28, 29, 30 and 31 supply signals reproduced from the magnetic tape T1a or T2a via the rotary heads Hp1a, Hm1a, Hp2a and Hm2a to the controller and signals processor 26.

Since the four rotary heads are arranged as described above with reference to FIG. 1, the rotary loci of the four rotary heads Hp1a, Hm1a, Hp2a and Hm2a are recorded on the magnetic tape T1a or T2a in the order of locus (Hp1a) →locus (Hm1a)→locus (Hp2a)→locus (Hm2a)→locus (Hp1a)→•••.

Therefore, the controller and signal processor 26 sequentially switches, on a time axis, the recording and reproducing circuits 28 to 31 and the rotary heads Hp1a, Hm1a, Hp2a and Hm2a for recording or reproducing operation. Or, the controller and signal processor 26 simultaneously activates a plurality of the circuits and rotary heads if required.

Tracking control of the magnetic tapes T1a and T2a while travelling may be done with tracking control signals recorded on the magnetic tapes, via a fixed control head (not shown), etc.

Figure 2:
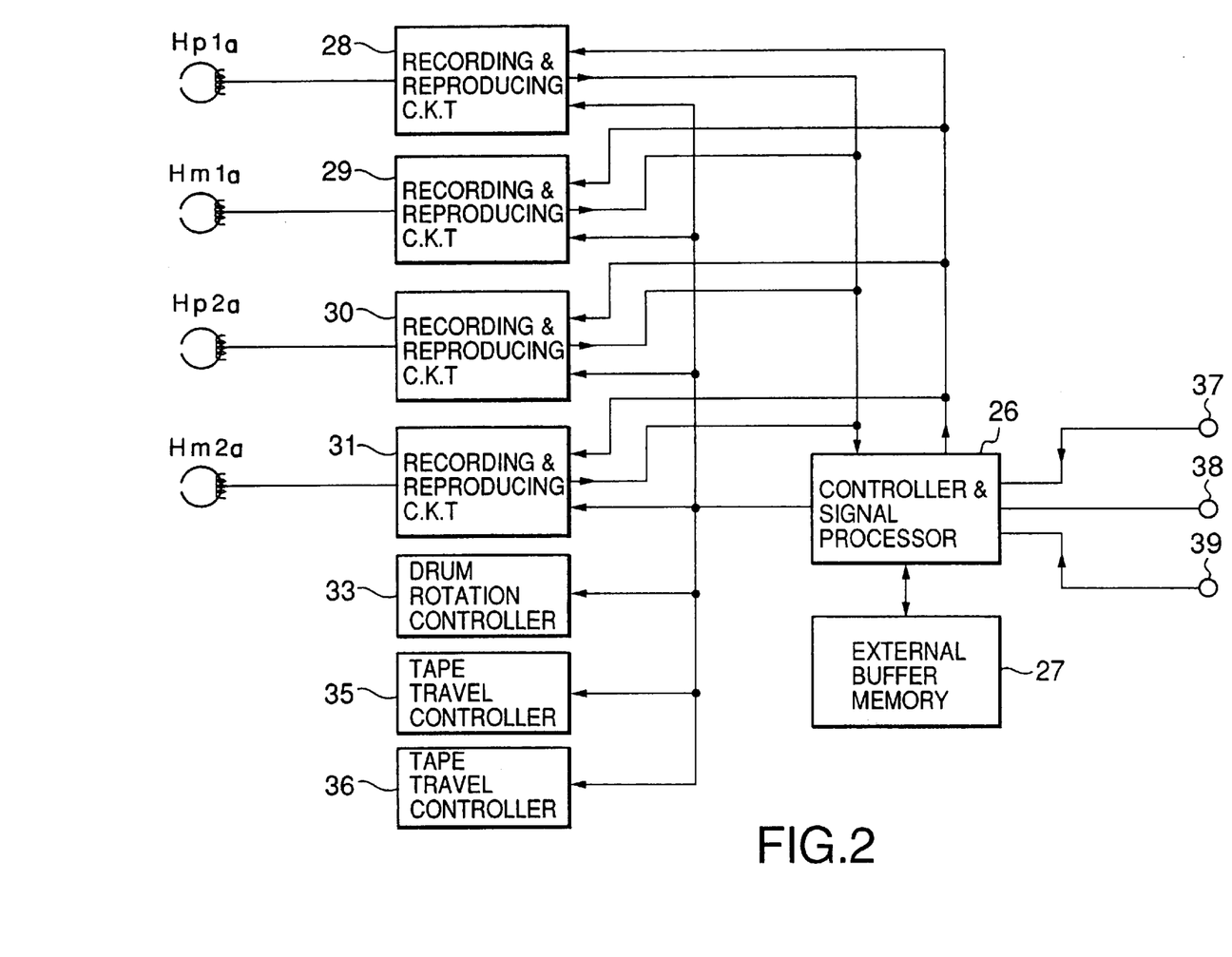
FIG. 2 is a block diagram of the recording and reproducing apparatus shown in FIG. 1.

In FIG. 2, a drum rotation controller 33 controls a rotation speed and rotation phase of the rotary drum Du in response to control data supplied by the controller and signal processor 26.

Tape travel controllers 35 and 36 control the magnetic tapes T1a and T2a, respectively, while travelling. More in detail, the controllers 35 and 36 conduct capstan control so that the magnetic tapes T1a and T2a travel at different predetermined speeds during recording. On the other hand, during reproduction, the controllers 35 and 36 conduct capstan control on the basis of tracking data recorded on the magnetic tapes T1a and T2a so that the rotary heads Hp1a, Hm1a, Hp2a and Hm2a follows the recorded loci (tracks) on the magnetic tapes T1a and T2a.

Data formats and methods of reproducing the data from the first and second tape-like recording media T1a and T2a will be described. These data formats and reproduction methods can be supplied not only to the first embodiment but also to the second and third embodiments which will be described later.

Figure 3A:
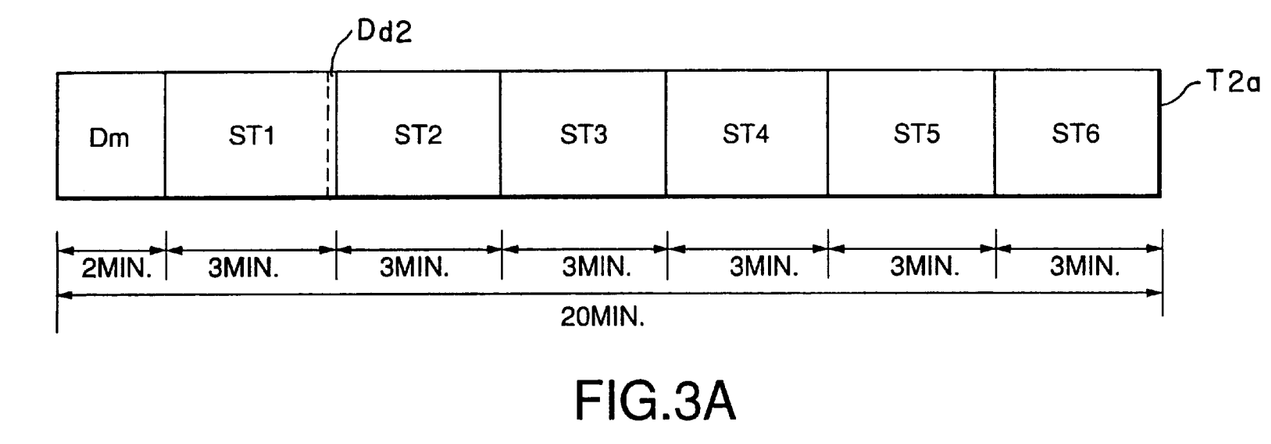
FIGS. 3A and 3B illustrate data formate employed by the present invention.
Figure 3B:
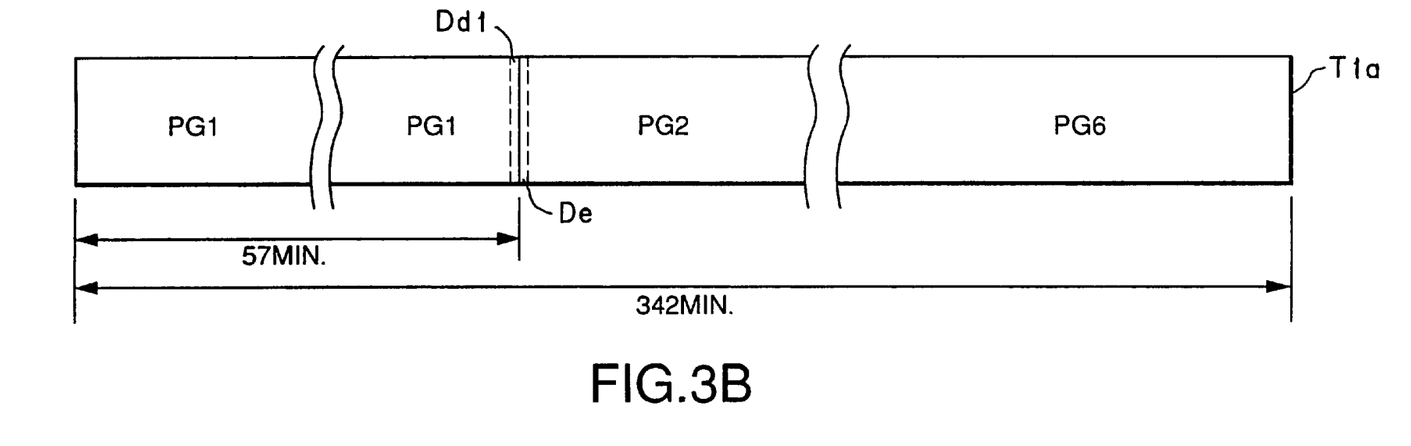

FIG. 3B shows a plurality of program (main) data PG1, PG2, . . . such as movies recorded on the first magnetic tape T1a. On the contrary, FIG. 3A shows a plurality of data ST1, ST2, . . . recorded on the second magnetic tape T2a shorter than the first magnetic tape T1a. Each of the data ST1, ST2, . . . includes a head field, or a starting portion of program data, such as a movie, recorded on the first magnetic tape T1a. For example, the data ST1 or FIG. 3A includes the starting portion of a movie of program data PG1 of FIG. 3B.

Data Dm shown in FIG. 3A and recorded at the head of the second magnetic tape T2a is magnetic data including data for managing the second magnetic tape T2a, head address of the program data PG1, PG2, . . . on the first magnetic tape T1a and the head field data ST1, ST2, . . . . of move on the second magnetic tape T2a, movie titles, data of recording, etc.

The managing data Dm recorded on the second magnetic tape T2a may be reproduced per reproduction of one program cats. Or, it may be reproduced at the initial status of the recording and reproducing apparatus and stored in a memory of the controller and signal processor 26 shown in FIG. 2 for a quick search.

FIG. 3B shows the first magnetic tape T1a with a length available for six hour (360 minutes)-continuous recording. The magnetic tape T1a thus can record six 1-hour programs. And, the recording and reproducing apparatus in this embodiment is capable of 120-folded speed quick forward/backward winding. The first magnetic tape T1a will thus be wound from head to and for about three minuets.

Then, as shown in FIG. 3A, 3 minute-starting portions (head fields) of six movies are recorded on the second magnetic tape T2a after the managing data Dm. And, as shown in FIG. 3B, the remaining 57 minute-portions of the six movies after the 3 minute-starting portions, totally 342 minutes, are recorded on the first magnetic tape T1a. In detail, the program data PG1 contains a 97 minute-portion of a move except a 3 minutes-starting portion of the same movie. The 3 minute-starting portion of the movie is contained in the data ST1 of FIG. 3A.

In this embodiment, the six 1-hour programs are recorded on the first magnetic tape T1a with the total 342 minute-recording time and on the second magnetic tape T2a with 18 minute-recording time. And the second magnetic tape T2a has a length corresponding to 20 minutes enough for recording the 18 minutes (the same as a normal reproduction time) for movies and 2 minutes for the managing data Dm. Thus, 120-fold speed quick winding of the second magnetic tape T2a from head to end requires about tan seconds.

If a magnetic tape used in the recording and reproducing apparatus is only one recorded totally 350 minute-movies and capable of 120-fold speed quick forward/backward winding, an access time to any of the movies will be more than three minutes.

However, according to the invention, as shown in FIG. 3A, three minute-starting portions (head fields) of the movies, corresponding to the three minute-access time for the first magnetic tape T1a are recorded on the second magnetic tape T2a after the managing data Dm.

Then is reproduction of any of the movies, the first portion (head field) of the movie is first reproduced from the second magnetic tape T2a for three minutes while the movie is being searched among the movies recorded on the first magnetic tape T1a for the three minutes. Reproduction from the magnetic tape T1a is wetting during this search mode. Reproduction is then switched with no intermission from the second magnetic tapes T2a to the first magnetic tape T1a so that the 57 minute-portion of the movie reproduced from the first magnetic tape T1a will follow the 3 minute-start portion of the movie already reproduced from the second magnetic tape T2a. This results in a 10 second-total access time to the movie, or one main data.

Reproduction switching with no intermission from the magnetic tapes T2a to T1a is done with discriminating data such as data Dd1 and Dd2 recorded between the data adjacent to each other and recorded on the first and second magnetic tapes T1a and T2a, respectively.

The same address can be recorded as the discriminating data Dd1 and Dd2 between the data such as the data PG1 and PG2, and ST1 and ST2 on the first and second magnetic tapes T1 and T2a, respectively. In this case, for example, while the starting portion (head field data ST2) of movie is being reproduced from the second magnetic tape T2a, the discriminating data Dd1 identical to the data Dd2 is searched along the first magnetic tape T1a. Then, reproduction is switched from the second magnetic tape T2a to the first magnetic tape T11a when the reproduction of the starting portion (head field data ST2) is complete to reproduce the movie (main data PG2) that follows the starting portion.

Another method for reproduction switching with no intermission from the magnetic tapes T2a to T2a uses the data identical to the and data of the data ST1, ST2, . . . on the second magnetic tape T2a, recorded on the head of the data PG1, PG2, . . . on the first magnetic tape T1a.

In this case, for example, the starting portion of movie (head field data ST2) is reproduced first. While, the end data of the data ST2 is being reproduced, data De identical to the end data is searched along the first magnetic tape T1a.

Then, the reproduction is switched from the second magnetic tape T2a to the first magnetic tape T2a when the reproduction of the end data is complete to reproduce the movie (main data PG2) that follows the data De.

Next, the second preferred embodiments of the cassette and the recording and reproducing apparatus according to the present invention will be described in detail.

In FIG. 4, first and second magnetic tapes T1b and T2b pulled out by different loading mechanisms (not shown) are wound around rotary drums Du1 and Du2, respectively, and set along each tape travel passage for recording and reproduction.

In detail, after pulled out from the first reel 1b, the first magnetic tape T1b is set along the tape travel passage of the guide pole 6b, a guide pole 22b, a guide pole 11b, an inclined pole 12b, the outer surface of the rotary drum Du1 and a fixed drum (not shown), an inclined pole 13b, a guide pole 14b, a capstan 15b and a pinch roller 16b, the guide pole 7b and the second reel 2b.

Further, after pulled out from the third reel 3b, the second magnetic tape T2b is set along the tape travel passage of a guide pole 10b, a guide pole 23b, an inclined pole 17b, the outer surface of the rotary drum Du2 and a fixed drum (not shown), an inclined pole 18b, a guide pole 19b, a capable 20b and a pinch roller 21b, the guide pole 8b and the fourth reel 4b.

The magnetic tape T1b pulled out by the loading mechanism is wound around the rotary drum Du1 and fixed drum (not shown) corresponding to a range covered by a central angle 180 degrees.

On the other hand, the magnetic tape T2b pulled out by the other loading mechanism is wound around the rotary drum Du2 and fixed drum (not shown) corresponding to a range covered by the central angle 180 degrees.

In FIG. 4, each of first and third rotary heads Hg1b and Hp2b is provided with a magnetic gap having an azimuth angle $\alpha$ of 90 degrees or less in a clockwise direction with respect to a width direction of a locus of data recorded on the magnetic tape T1b or T2b.

On the other hand, in FIG. 4, each of second and fourth rotary heads Hm1b and Hm2b is provided with a magnetic gap having the azimuth angle $\alpha$ of 90 degrees or less in an anticlockwise direction with respect to the width direction of the locus of data recorded on the magnetic tape T1b or T2b.

The rotary heads Hp1b and Hm1b are provided to face each other with respect to the central axis of the rotary drum Du1. Further, the rotary heads Hp2b and Hm2b are provided to face each other with respect to the central axis of the rotary drum Du2.

Figure 5:
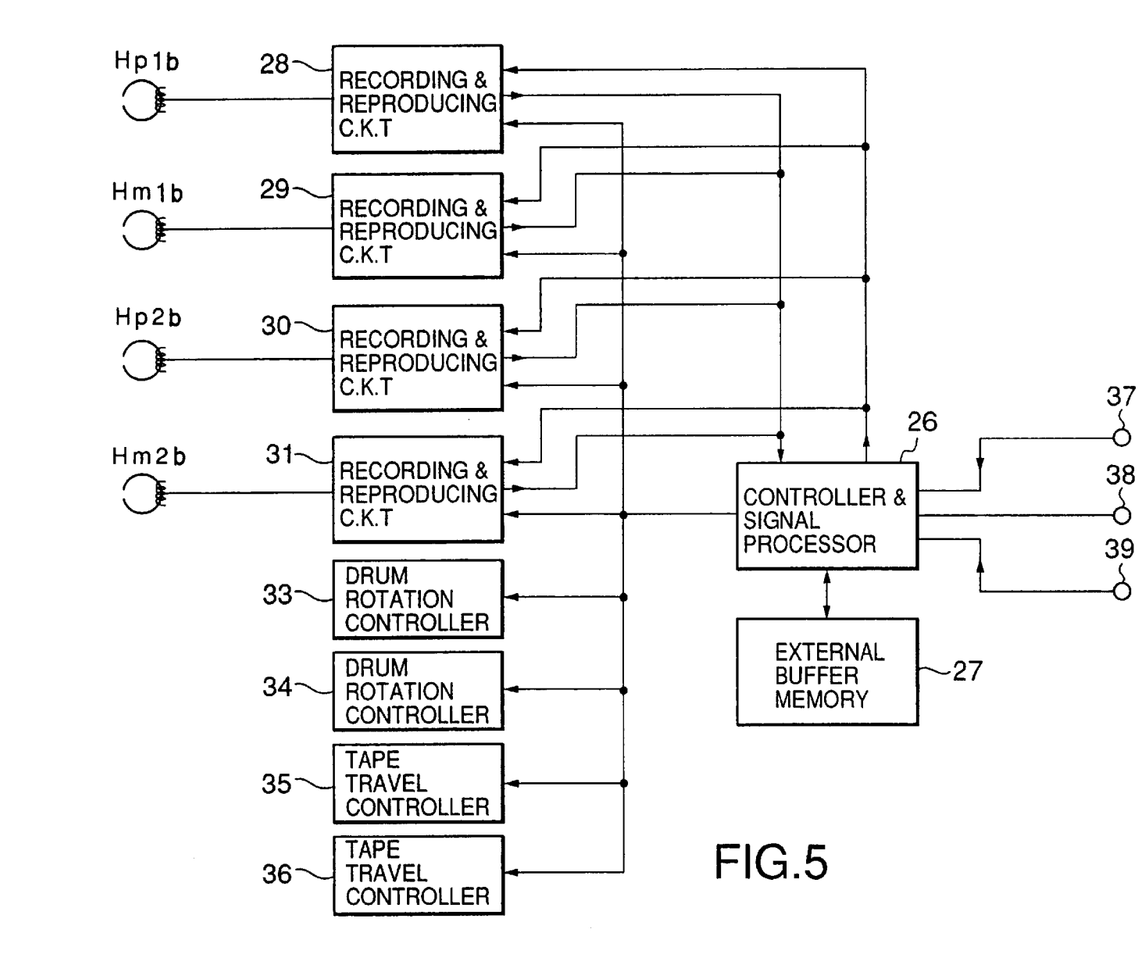
FIG. 5 is a block diagram of the recording and reproducing apparatus shown in FIG. 4.

A block diagram of the second preferred embodiment of the recording and reproducing apparatus according to the present invention is shown in FIG. 5.

Elements in this embodiment that are the same as or analogous to elements in the first embodiment of FIG. 2 are reference by the same reference numbers and will not be explained.

The difference between the first and second embodiments lies in a drum rotation controller 34 of FIG. 5. In other wards, the second embodiment employs the two drum rotation controllers 33 and 34 for the two rotary drums Du1 and Du2, respectively.

Next, the third preferred embodiments of the cassette and the recording and reproducing apparatus according to the present invention will be described in detail.

The cassette TCc shown in FIG. 6 houses first and second tape-like recording media T1c and T2c which are never pulled from a cassette frame 5c even though the cassette TCc is loaded into the recording and reproducing apparatus.

The first tape-like recording medium T1c travels along the passage of the first reel 1c, guide pulses 6c and 7c and second reel 2c. The second tape-like recording medium T2c travels along the passage of the third reel 3c, guide poles 9c and 9c and fourth reel 4c.

A first photomagnetic recording and reproducing unit 40 is provided to face the cassette TCc at its opening formed a side face thereof. The unit 40 conducts recording and reproducing operations to and from the first tape-like recording medium T1c.

On the other hand, a second photomagnetic recording and reproducing unit 41 is provided to face the cassette TCc at its another opening formed another side face thereof. The unit 41 conducts recording and reproducing operations to and from the second tape-like recording medium T2c.

As described above, according to the present invention, the first and second tape-like recording media are housed in a cassette such that the first tape-like recording medium is wound around first supply and take-up reels arranged in a first direction in the cassette, and the second tape-like recording medium is wound around second supply and take-up reels shorter than the first reels in diameter arranged in a second direction orthogonal to the first direction in the cassette. Thus, a compact structure of a cassette housing at least two tape-like recording media can be achieved.

Further, according to the present invention, a plurality of first (main) discriminating data such as address are recorded, one by one, between adjacent two of main data on the first tape-like recording medium, and a plurality of second (sub) discriminating data such as addresses are recorded, one by one, between adjacent two of head fields of the main data, on the second tape-like recording medium. Here, each second discriminating data recorded between adjacent two of the head fields corresponding to adjacent two of the main data is identical to first discriminating data recorded between the two main data.

While a head field of main data is being reproduced from the second tape-like recording medium, a first discriminating data identical to a second discriminating data recorded in front of the head field is searched along the first tape-like recording medium. Then, reproduction is switched from the second tape-like recording medium to the first tape-like recording medium when reproduction of the head field is complete to reproduce main data that follows the searched head field.

Further, according to the present invention, data identical to end data of head fields on the second tape-like recording medium are recorded in front of main data on the first tape-like recording medium. In reproduction, while an end data of a head field is being reproduced, the data identical to the end data is searched along the first tape-like recording medium. Then, reproduction is switched from the second tape-like recording medium to the first tape-like recording medium when reproduction of the end data is complete to reproduce main data that follows the searched data identical to end data.

Accordingly, the first and second tape-like recording media can be used as if the two recording media constitute one endless tape by repeating the reproduction above. Further, quick access to the tape-like recording media can be achieved.

What is claimed is:

1. A cassette comprising:

first and second reels, both having a first diameter;

at least a first tape guide provided between the first and second reels;

a first tape-like recording medium wound around the first and second reels via the first tape guide;

third and fourth reels, both having a second diameter shorter than the first diameter;

at least a second tape guide provided between the third and fourth reels; and a second tape-like recording medium wound around the third and fourth reels via the second tape guide, the first and second tape-like recording media being different in length from each other, wherein a plurality of main data are recorded on the first tape-like recording medium, and head fields of the main data are recorded on the second tape-like recording medium.

2. The cassette according to claim 1, wherein managing data is recorded at a head of the second tape-like recording medium, the managing data including at least data for managing the second tape-like recording medium.

3. The cassette according to claim 1, wherein a plurality of first discriminating data are recorded, one by one, between adjacent two of the main data on the first tape-like recording medium, and a plurality of second discriminating data are recorded, one by one, between adjacent two of the head fields on the second tape-like recording medium, each second discriminating data recorded between two of the head fields being identical to each first discriminating data recorded between two of the main data, where the two of the main data correspond to the two of the head fields.

4. A recording and reproducing apparatus for recording and reproducing data on and from first and second tape-like recording media contained in a cassette, comprising:

first and second reels housed in the cassette, both having a first diameter, at least a first tape guide provided between the first and second reels, the first tape-like recording medium being wound around the first and second reels via the first tape guide, the first and second reels being arranged in a first direction in the cassette;

third and fourth reels both having a second diameter shorter than the first diameter, at least a second tape guide provided between the third and fourth reels, the second tape-like recording medium being wound around the third and fourth reels via the second tape guide, the third and fourth reels being arranged in a second direction in the cassette;

a first recording and reproducing mechanism for recording and reproducing data on and from the firs tape-like recording medium, the first recording and reproducing mechanism recording and reproducing the data on and from the first tape-like recording medium through an opening formed on a side face of the cassette in the first direction; and a second recording and reproducing mechanism for recording and reproducing data on and from the second tape-like recording medium, the second recording and reproducing mechanism recording and reproducing the data on and from the second tape-like recording medium through another opening formed on another side face of the cassette in the second direction.

5. The apparatus according to claim 4, wherein the first and second recording and reproducing mechanisms photomagnetically record and reproduce the data on and from the first and second tape-like recording media, respectively.

6. A recording and reproducing apparatus comprising at least one recording and reproducing mechanism used for recording and reproducing data on and from a first and a second tape-like recording medium contained in a cassette, comprising:

first and second reels housed in the cassette, both having a first diameter, at least a first tape guide provided between the first and second reels, the first tape-like recording medium being wound around the first and second reels via the first tape guide;

third and fourth reels housed in the cassette, both having a second diameter shorter than the first diameter, at least a second tape guide provided between the third and fourth reels, the second tape-like recording medium being wound around the third and fourth reels via the second tape guide; and a recording and reproducing mechanism for recording and reproducing data on and from the first and second tape-like recording media, including a rotary drum, in recording and reproduction, the first tape-like recording medium being wound around a first outer surface of the rotary drum, the second tape-like recording medium being wound around a second cuter surface of the rotary drum, the first and second outer surfaces being symmetrical with respect to a central axis of the rotary drum, each of the first and second outer surfaces corresponding to a range covered by a 90 degree-central angle.

7. The apparatus according to claim 6, wherein the rotary drum is provided at least a first, a second, a third and a fourth rotary magnetic head, the first and second rotary magnetic heads facing each other with respect to the central axis of the rotary drum, the third and fourth rotary magnetic heads facing each other with respect to the central axis, the four rotary magnetic heads being arranged so that adjacent two of the four rotary magnetic heads form an angle of 90 degrees with respect to the central axis.

8. The apparatus according to claim 7, wherein each of first and second rotary heads is provided with a magnetic gap having an azimuth angle of 90 degrees or less in a clockwise direction with respect to a width direction of a locus of data recorded on the first or the second magnetic tape, and each of third and fourth rotary heads is provided with a magnetic gap having an azimuth angle of 90 degrees or less in an anticlockwise direction with respect to the width direction of the locus of data recorded on the first or the second magnetic tape.

9. The apparatus according to claim 7, wherein the rotary drum is provided with N (a natural number of 2 or more) sets of rotary magnetic heads, each set including the first, second, third and fourth rotary magnetic heads.

10. An apparatus for reproducing data from a first and a second tape-like recording medium, comprising:

a reproducer to reproduce one of head fields of a plurality of main data, each head field being recorded after a sub discriminating data on the second tape-like recording medium; and a controller to search one or main discriminating data identical to the sub discriminating data, each main discriminating data being recorded in front of the main data on the first tape-like recording medium, the first and second recording media being contained in a cassette such that the second tape-like recording medium is shorter in length than the first tape-like recording medium, and to switch reproduction of the reproducer from the second tape-like recording medium to the first tape-like recording medium when the reproduction of the head field is complete, thus controlling the reproducer to reproduces main data that follows the searched main discrimination data.

11. An apparatus for reproducing data from a first and a second tape-like recording medium, comprising:

a reproducer to reproduce one of head fields of a plurality of main data, the head fields being recorded on the second tape-like recording medium, the first and second tape-like recording media being contained in a cassette such that the second tape-like recording medium is shorter in length than the first tape-like recording medium; and a controller to search a first end portion identical to a second end portion of the head field which is being reproduced, while the second end portion is being reproduced, the first end portion being recorded at a head of each of the main data recorded on the first tape-like recording medium, and to switch reproduction of the reproducer from the second tape-like recording medium to the first tape-like recording medium when the reproduction of the second end portion is complete, thus controlling the reproducer to reproduce main data that follows the searched first end portion.

12. A method of reproducing data from a first and a second tape-like recording medium, comprising the steps of:

reproducing one of head fields of a plurality of main data each head field being recorded after a sub discriminating data on the second tape-like recording medium;

searching one of main discriminating data identical to the sub discriminating data, such main discriminating data being recorded in front of the main data on the first tape-like recording medium, the first and second recording media being contained in a cassette such that the second tape-like recording medium is shorter in length than the first tape-like recording medium;

switching reproduction from the second tape-like recording medium to the first tape-like recording medium when the reproduction of the head field is complete; and reproducing main data that following the searched main discrimination data.

13. A method of reproducing data from a first and a second tape-like recording medium, comprising the steps of:

reproducing one of head fields of a plurality of tape-like recording medium, the first and second tape-like recording media being contained in a cassette such that the second tape-like recording medium is shorter in length than the first tape-like recording medium;

searching a first end portion identical to a second end portion of the head field which is being reproduced, while the second end portion is being reproduced, the first end portion being recorded at a head of each of the main data recorded on the first tape-like recording medium;

switching reproduction from the second tape-like recording medium to the first tape-like recording medium when the reproduction of the second end portion is complete; and reproducing main data that follows the searched first end portion.

14. A cassette comprising:

first and second reels, both having a first diameter;

at least a first tape guide provided between the first and second reels;

a first tape-like recording medium wound around the first and second reels via the first tape guide;

third and fourth reels, both having a second diameter shorter than the first diameter;

at least a second tape guide provided between the third and fourth reels; and a second tape-like recording medium wound around the third and fourth reels via the second tape guide, the first and second tape-like recording media being different in length from each other;

wherein the first and second reels are arranged in a first direction in the cassette and the third and fourth reels are arranged in a second direction orthogonal to the first direction in the cassette.

15. The cassette according to claim 14 further comprising a first side face formed n the first direction and a second side face formed in the second direction, each side face having an opening through which data is recorded on or reproduced from the first or the second tape-like recording medium.

* * * * *